Feb. 20, 1923.
O. A. CARLSON.
HANDLE BAR FOR BICYCLES AND THE LIKE.
FILED SEPT. 10, 1920.
1,445,995.
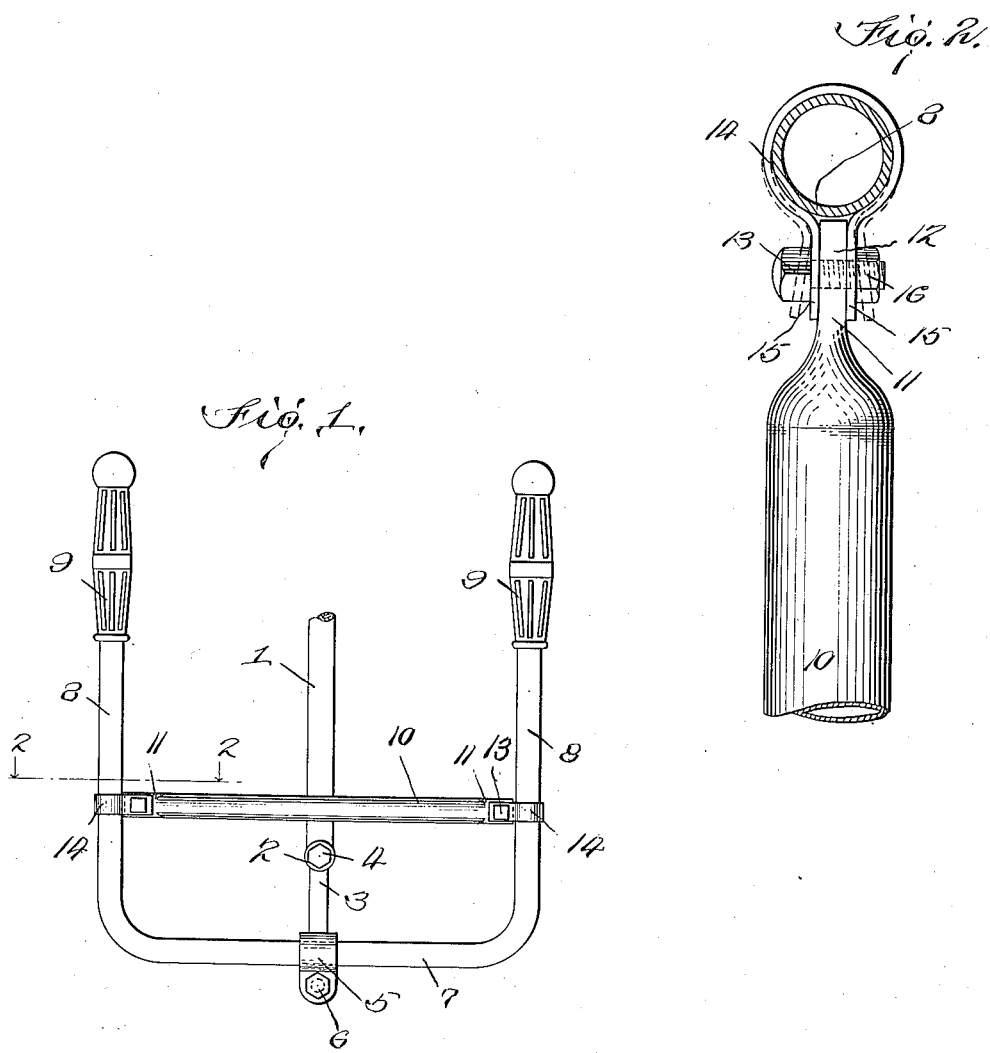
Inventor
Oscar A. Carlson
By his Attorney Patented Feb. 20, 1923.

1,445,995

UNITED STATES PATENT OFFICE.

OSCAR ALBERT CARLSON, OF READING, PENNSYLVANIA, ASSIGNOR TO D. P. HARRIS MANUFACTURING COMPANY, OF READING, PENNSYLVANIA, A CORPORATION OF PENNSYLVANIA.

HANDLE BAR FOR BICYCLES AND THE LIKE.

Application filed September 10, 1920. Serial No. 409,330.

*To all whom it may concern:*

Be it known that I, OSCAR ALBERT CARLSON, a citizen of the United States, residing at Reading, in the county of Berks and State of Pennsylvania, have invented new and useful Improvements in Handle Bars for Bicycles and the like, of which the following is a specification.

This invention relates to improvements in handle bars for bicycles and the like and consists of an improved construction of the braced type of bar wherein the bracing member is connected to the respective rearwardly extending arms of the handle bar to impart rigidity thereto. My present invention has for its object to provide an improved bar of the type aforesaid which shall be particularly simple and economical in its manufacture and which will afford certain important advantages over handle bars of this type as heretofore constructed.

Important features of my improved construction consist in the provision of an adjustable and detachable bracing member to the handle bar proper provided with a simple and efficient form of clamping means whereby it may be rigidly clamped in position to reinforce the bar. In the attaching of the bracing members to the handle bars, it is the present practice to permanently attach a bracing member either by drilling into the tube of the bar to receive the ends of the bracing member or to provide lap joints and permanently secure the bracing member to the tube or bar by bracing the same in position from which it will be understood that in either event the handle bar is weakened to a considerable degree. By so securing the bracing member or brace to the bar it is affixed in its position so as not to permit of any adjustment forwardly and rearwardly and moreover offers difficulties and adds to the expense of polishing and finishing of the bar in addition to adding materially to the cost of manufacturing.

My improved construction employing an adjustable and detachable bracing member permits of adding the bracing feature to a handle bar without impairing the structural strength of the handle bar; permits of conveniently and more inexpensively finishing and polishing both the handle bar and bracing member; permits of assembling the handle bar upon its supporting post initial to the attachment of the bracing member or bar thereby facilitating the assembling operation; permits of adjusting of the bracing bar forwardly and rearwardly as desired by the rider and my improved detachable bracing bar is further adapted for attachment to unbraced bars to convert them into the braced type when desired. The clamp or securing member of my improved detachable brace is furthermore particularly designed to efficiently and securely attach the bracing member in position.

The described and other features and advantages of my invention will be understood by reference to the accompanying drawing wherein a desirable embodiment is illustrated and wherein like reference numerals are applied to the corresponding parts in the views thereof.

Fig. 1 is a plan view of a handle bar for bicycles, motorcycles and the like having the features of my present invention incorporated therewith.

Fig. 2 is a detailed vertical sectional view taken on line 2, 2 of Fig. 1 illustrating in detail the features of my improved form of detachable bracing member.

In the approved embodiment of the features of my present invention as herein disclosed 1 indicates the frame bar of the bicycle, 2 the forward head portion or steering column, 3 the usual steering post clamped to the steering column by the usual top nut 4 forwardly extending therefrom and provided at its forward end portion with the split clamping member 5 provided with the tightening nut 6 to which the handle bar 7 is attached in the usual manner The handle bar as shown is of the well known motorcycle type formed of tubular metal fashioned as illustrated with the opposite parallel and longitudinally extending portions 8, 8 to which the usual grips or handles 9, 9 are attached over the extremities thereof.

In accordance with my present invention I have devised a separable or detachable bracing member 10 which as shown, may desirably be of tubular metal having its end portions 11, 11 flattened and provided with suitable apertures 12 to receive the shanks of securing bolts 13 for attachment of the bracing member to the extensions 8 of the handle bar. To cooperate therewith a simple form of clamping member is employed consisting of a flat metallic band 14 curved to enclose and clamp over the tubular portions 8 of the bar and formed with perforated inwardly extending ear portions 15 adapted to receive between them the flattened portion 11 of the bracing member and to receive within the apertures thereof the shank of the bolt 13. The latter is suitably threaded to receive the clamping nut 16 preferably threaded to the projecting lower portion thereof.

The tubular handle bars as at present manufactured are of standard diameter and as will be understood the curved body portion of the clamping member 14 is relatively of a size to have a tight clamping fit thereon whereby upon tightening up of the securing nut 16 a gripping action by the clamping member 14 upon the handle bar will obtain and the metal of the clamping member will be held under tension. As will be understood an effective clamping of the bracing bar to the parallel portions of the handle bar will be thus effected and by reason of the clamping members being held under tension the extremities 15 thereof will tend to lock the securing nut against loosening. In the forming of the clamping member 14, as will be understood, it will be bent to form substantially as indicated in dotted lines of Fig. 2 with the end portions 15 thereof in relatively wider spaced relation than the positions assumed by said end portions when in clamping position from which it results that said member is held in tension as hereinbefore described. It will be noted that a further desirable feature of my improved arrangement is that the parts are formed whereby the bracing bar will be supported with its central longitudinal axis upon a horizontal plane with the central axis of the handle bar members to which it is connected.

I have thus produced a separable and adjustable bracing bar of simple and inexpensive construction which when in assembled position will provide a rigidly reinforcing connection between the horizontally extended portions 8 of the handle bar so as to add strength thereto and moreover which will preserve the inherent structural strength of the tubular handle bar itself. In addition to the advantages hereinbefore referred to my improved separable bracing bar may be advantageously employed for the repairing of handle bars of the permanent braced type when the permanent bracing member pulls out as often occurs. In such event upon the removal of the permanent bracing member my improved detachable brace may be applied by simply removing the grips and positioning the clamping members 14 so as to cover the mutilated portions of the handle bar 2 whereby a simple repair is made without requiring refinishing of the bar.

Having described my invention, I claim:—

1. As a new article of manufacture, a separable and adjustable bracing member for handle bars of the character described, comprising a tubular bar having flattened and perforated extremities, clamping means attached thereto comprising a clamping member of sheet metal formed to encircle the handle bar, said clamping means being provided with inwardly extending perforated ears adapted to receive between them the extremity of the tubular bar, and a clamping bolt fitted to the perforations of the clamp and the bar.

2. In combination with a handle bar for bicycles, motorcycles and the like having parallel longitudinal extending end portions, of a separable and adjustable bracing member comprising a tubular bar member adapted to be interposed between the parallel portions of the handle bar, said tubular member having flattened and perforated extremities, clamping means adapted to connect the extremities of the tubular bar to the handle bar, said clamping means being provided with apertured inward extensions, securing bolts fitted into the apertures of said extensions and of the bracing bar and having a securing nut threaded thereon, said clamping means being held under tension when in tightened position.

In testimony whereof I have signed my name to this specification.

OSCAR ALBERT CARLSON.

Witnesses:
 JOHN FRANCIS LARKIN, Jr.,
 RAY BUCHER.